US009719044B2

(12) United States Patent
Matsumoto et al.

(10) Patent No.: US 9,719,044 B2
(45) Date of Patent: Aug. 1, 2017

(54) LUBRICATING OIL COMPOSITION FOR REFRIGERATING MACHINES

(71) Applicant: IDEMITSU KOSAN CO., LTD., Chiyoda-ku (JP)

(72) Inventors: Tomoya Matsumoto, Ichihara (JP); Tadashi Kisen, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/388,981

(22) PCT Filed: Mar. 21, 2013

(86) PCT No.: PCT/JP2013/058166
§ 371 (c)(1),
(2) Date: Sep. 29, 2014

(87) PCT Pub. No.: WO2013/146550
PCT Pub. Date: Oct. 3, 2013

(65) Prior Publication Data
US 2015/0065407 A1    Mar. 5, 2015

(30) Foreign Application Priority Data

Mar. 30, 2012   (JP) ................................. 2012-082200

(51) Int. Cl.
| | | |
|---|---|---|
| *C09K 5/00* | (2006.01) | |
| *C09K 5/04* | (2006.01) | |
| *C10M 107/34* | (2006.01) | |
| *C10M 169/04* | (2006.01) | |
| *C10M 127/04* | (2006.01) | |
| *C10M 171/00* | (2006.01) | |
| *C10M 105/06* | (2006.01) | |

(52) U.S. Cl.
CPC ........... *C10M 169/04* (2013.01); *C09K 5/045* (2013.01); *C10M 105/06* (2013.01); *C10M 127/04* (2013.01); *C10M 171/007* (2013.01); *C10M 171/008* (2013.01); *C09K 2205/126* (2013.01); *C10M 2203/06* (2013.01); *C10M 2203/065* (2013.01); *C10M 2203/1006* (2013.01); *C10M 2205/003* (2013.01); *C10M 2205/0285* (2013.01); *C10M 2205/223* (2013.01); *C10M 2207/026* (2013.01); *C10M 2207/0406* (2013.01); *C10M 2207/2835* (2013.01); *C10M 2209/043* (2013.01); *C10M 2209/1023* (2013.01); *C10M 2209/1033* (2013.01); *C10M 2209/1055* (2013.01); *C10M 2209/123* (2013.01); *C10M 2215/225* (2013.01); *C10N 2220/022* (2013.01); *C10N 2220/302* (2013.01); *C10N 2220/303* (2013.01); *C10N 2220/305* (2013.01); *C10N 2220/306* (2013.01); *C10N 2230/02* (2013.01); *C10N 2230/08* (2013.01); *C10N 2230/56* (2013.01); *C10N 2230/66* (2013.01); *C10N 2240/30* (2013.01); *C10N 2240/56* (2013.01)

(58) Field of Classification Search
CPC .................. C10M 2207/125; C10M 2209/104
USPC .................................................. 508/459, 579
See application file for complete search history.

(56) References Cited

U.S. PATENT DOCUMENTS

| | | | |
|---|---|---|---|
| 4,758,366 A | 7/1988 | Parekh | |
| 5,547,593 A | 8/1996 | Sanechika et al. | |
| 5,711,895 A * | 1/1998 | Takigawa et al. | ............... 252/68 |
| 2005/0151110 A1 | 7/2005 | Minor et al. | |
| 2010/0122545 A1 | 5/2010 | Minor et al. | |
| 2010/0234256 A1 | 9/2010 | Sato et al. | |
| 2010/0292111 A1 | 11/2010 | Villalobos Sandoval et al. | |
| 2013/0012420 A1 | 1/2013 | Matsumoto | |

FOREIGN PATENT DOCUMENTS

| | | |
|---|---|---|
| CN | 101542219 A | 9/2009 |
| CN | 102215917 A | 10/2011 |
| EP | 0 717 098 A2 | 6/1996 |
| EP | 0 717 098 A3 | 6/1996 |
| JP | 61-211391 A | 9/1986 |
| JP | 2006-052938 A | 2/2006 |
| JP | 2006-307129 A | 11/2006 |

(Continued)

OTHER PUBLICATIONS

International Search Report issued Jun. 18, 2013 in PCT/JP2013/058166 filed Mar. 21, 2013.
Extended Search Report issued Oct. 26, 2015 in European Patent Application No. 13769190.3.
Chinese Office Action issued Oct. 8, 2015, in corresponding Chinese Patent Application No. 201380016275.8 (with English-language Translation).

(Continued)

*Primary Examiner* — Vishal Vasisth
(74) *Attorney, Agent, or Firm* — Oblon, McClelland, Maier & Neustadt, L.L.P.

(57) ABSTRACT

A lubricating oil composition for refrigerating machines contains a base oil and an additive in a form of a hydrocarbon compound having a biphenyl structure or a stilbene structure. When the present lubricating oil composition for refrigerating machines is used in refrigerating equipment such as an open-type automobile air-conditioner, an electric automobile air-conditioner, a gas heat pump, other air-conditioning equipment, a refrigerating machine, a vending machine, a showcase, a water-heating system and a refrigerating/heating system, it is possible to detect the leakage of a refrigerant with a long-lasting stability. Therefore, when an unsaturated chlorofluorocarbon refrigerant with a poor stability is used in the above-listed equipment, the present lubricating oil composition for refrigerating machines is significantly advantageous.

17 Claims, No Drawings

(56) References Cited

FOREIGN PATENT DOCUMENTS

JP      2011-202032 A     10/2011
WO     2010/059677 A2    5/2010

OTHER PUBLICATIONS

Combined Office Action and Search Report issued Jul. 26, 2016 in Chinese Patent Application No. 201380016275.8 (with English language translation).

* cited by examiner

LUBRICATING OIL COMPOSITION FOR REFRIGERATING MACHINES

This application is a 371 of PCT/JP2013/058166, filed Mar. 21, 2013."

TECHNICAL FIELD

The present invention relates to a lubricating oil composition for refrigerating machines.

BACKGROUND ART

Air-conditioner systems and cooling systems use a variety of refrigerants, which are likely to leak outside during use. In such a case, a refrigerant-leakage spot needs to be found. Typically, the leakage of the refrigerant is detected simply depending on the presence or absence of bubbles formed of soapy water sprayed onto pipes and joints in the system. These days, a leakage-detecting method using a fluorescent agent has been developed and a refrigerant-leakage-detecting fluorescent agent is sometimes provided in a receiver dryer in a refrigeration cycle in an automobile air-conditioner.

According to Patent Literatures 1 and 2, a fluorescence dye containing a polycyclic aromatic compound such as xanthene and perylene is used in a cooling system to detect the leakage of a refrigerant.

CITATION LIST

Patent Literature(s)

Patent Literature 1: JP-A-61-211391
Patent Literature 2: JP-A-2006-52938

SUMMARY OF THE INVENTION

Problems to be Solved by the Invention

It should be noted that a refrigerant usable in an air-conditioner system or a cooling system is a compound having an effect on global warming and thus a new refrigerant with a low global warming potential (GWP) has been sought. Examples of increasingly used refrigerants are: a refrigerant (unsaturated chlorofluorocarbon refrigerant) that has an unsaturated carbon-carbon bond in a molecule (e.g., R1234yf); and a refrigerant with a low global warming potential that contributes to reduction in system capacity (e.g., R32).

However, it has been found that typical fluorescent agents as disclosed in Patent Literatures 1 and 2 lower the thermal stability and chemical stability of a refrigerant oil when used in a system using a refrigerant with a low global warming potential.

An object of the invention is to provide a lubricating oil composition for refrigerating machines that exhibits thermal stability and chemical stability equal to or more than those of a typical refrigerant oil irrespective of the use of a refrigerant-leakage-detecting fluorescent agent.

Means for Solving the Problems

In order to solve the above problems, according to an aspect of the invention, the following lubricating oil composition for refrigerating machines is provided.

A lubricating oil composition for refrigerating machines containing: a base oil; and an additive in a form of a hydrocarbon compound having a biphenyl structure or a stilbene structure.

In the above aspect, the lubricating oil composition for refrigerating machines is used in a refrigerating machine that contains a refrigerant containing at least one of a saturated hydrofluorocarbon compound (saturated HFC), carbon dioxide ($CO_2$), hydrocarbon (HC) having 5 or less carbon atoms, ammonia, and a fluorine-containing organic compound represented by the following molecular formula (A).

$$C_pO_qF_rR_s \qquad (A)$$

In the formula: R represents Cl, Br, I or hydrogen; p is an integer of 1 to 6; q is an integer of 0 to 2; r is an integer of 1 to 14; and s is an integer of 0 to 13 with the proviso that when q is 0, p is an integer of 2 to 6 and one or more unsaturated carbon-carbon bonds are contained in a molecule.

In the above aspect, the refrigerant is saturated HFC having 1 to 3 carbon atoms or unsaturated HFC having 3 carbon atoms and having a carbon-carbon double bond.

In the above aspect, the base oil contains at least one compound selected from among alkylbenzene, alkylnaphthalene, poly-alpha-olefin, polyvinylether, polyalkylene glycol, polycarbonate, polyol ester and an ether compound represented by the following formula (1).

$$Ra\text{---}[(ORb)n\text{---}(B)\text{---}(ORc)k]x\text{---}Rd \qquad (1)$$

In the formula: Ra and Rd each represent a hydrogen atom, an alkyl group having 1 to 10 carbon atoms, an acyl group having 2 to 10 carbon atoms, or a hydrocarbon group having 2 to 6 bonds and having 1 to 10 carbon atoms; Rb and Rc each represent an alkylene group having 2 to 4 carbon atoms; n and k each are an integer of 0 to 20; x is an integer of 1 to 6; and (B) represents a polymer portion having 3 or more monomer units represented by the following formula (2).

Formula 1

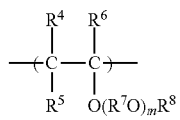

(2)

In the formula: $R^4$, $R^5$ and $R^6$ each represent a hydrogen atom or a hydrocarbon group having 1 to 8 carbon atoms and are mutually the same or different; $R^7$ represents a divalent hydrocarbon group having 1 to 10 carbon atoms or a divalent ether-bonded oxygen-containing hydrocarbon group having 2 to 20 carbon atoms; $R^8$ represents a hydrogen atom or a hydrocarbon group having 1 to 20 carbon atoms; m is a number with an average of 0 to 10 and plural m are mutually the same or different in each unit; $R^4$ to $R^8$ are mutually the same or different in each unit; plural $R^7O$ are mutually the same or different; and m in the formula (2) is an integer of 1 or more when k and n in the formula (1) are both 0.

In the above aspect, the lubricating oil composition for refrigerating machines has a kinematic viscosity at 100 degrees C. in a range from 1 to 50 mm²/s.

In the above aspect, the base oil contains at least another additive selected from among an extreme pressure agent, an oiliness agent, an antioxidant, an acid scavenger, a metal deactivator and an antifoaming agent.

In the above aspect, the lubricating oil composition for refrigerating machines is used in refrigerating equipment such as an open-type automobile air-conditioner, an electric automobile air-conditioner, a gas heat pump, air-conditioning equipment, a refrigerating machine, a vending machine, a showcase, a water-heating system and a refrigerating/heating system.

The lubricating oil composition for refrigerating machines according to the above aspect can be thermally and chemically stable under an atmosphere of various refrigerants and thus a leakage-detecting performance can be exhibited for a long time. Therefore, the lubricating oil composition according to the above aspect is favorably usable in a refrigerating machine that uses an unstable refrigerant having an unsaturated bond.

DESCRIPTION OF EMBODIMENT(S)

A lubricating oil composition for refrigerating machines according to an exemplary embodiment of the present invention (hereinafter, also simply referred to as "the present composition") is a lubricating oil composition for refrigerating machines provided by blending a base oil with an additive in a form of a hydrocarbon compound having a biphenyl structure. The exemplary embodiment will be described below in detail.

The base oil may be a mineral oil or a synthetic base oil. The synthetic base oil is preferably at least one selected from among, for instance, alkylbenzene (AB), alkylnaphthalene (AN), poly-alpha-olefin (PAO), polyvinylether (PVE), polyalkylene glycol (PAG), polycarbonate (PC), polyol ester (POE) and an ether compound (ECP) represented by the above formula (1).

The above base oils will be first described below.

(1) Mineral Oil

The mineral oil is preferably a so-called highly purified mineral oil, examples of which are: a purified oil obtained by atmospheric distillation of a paraffin-base crude oil, an intermediate-base crude oil or a naphthene-base crude oil or by ordinarily purifying a distillate oil obtained by vacuum distillation of a residual oil left after atmospheric distillation; a deeply dewaxed oil obtained by performing deep dewaxing after purification; and a hydrotreated oil obtained by hydrotreatment. The purification method is not particularly limited and thus a variety of methods are usable.

(2) Alkylbenzene (AB)

Any alkylbenzene for a refrigerant oil may be usable, but, in terms of thermal stability, alkylbenzene (including monoalkylbenzene, dialkylbenzene and trialkylbenzene) having 20 or more carbon atoms in an alkyl group in total (when plural alkyl groups exist, the sum of carbon atoms in the alkyl groups) is preferable and alkylbenzene having 20 or more carbon atoms in total and having two or more alkyl groups (e.g., dialkylbenzene) is more preferable.

(3) Alkylnaphthalene (AN)

As the alkylnaphthalene according to the exemplary embodiment, alkylnaphthalene having a naphthalene ring bonded with two or three alkyl groups is favorably usable. In particular, the alkylnaphthalene further preferably has 20 or more carbon atoms in total in terms of thermal stability. According to the exemplary embodiment, one of such alkylnaphthalenes may be singularly used or, alternatively, a mixture of two or more thereof may be used.

(4) Poly-alpha-olefin (PAO)

As the poly-alpha-olefin according to the exemplary embodiment, a variety of poly-alpha-olefins are usable but an alpha-olefin polymer having 8 to 18 carbon atoms is typically used. Preferable examples of such a polymer are a 1-dodecene polymer, a 1-decene polymer and a 1-octene polymer in terms of viscosity index, low-temperature fluidity and evaporation loss. Among the above, a 1-decene polymer is preferable. Incidentally, according to the exemplary embodiment, the poly-alpha-olefin is preferably hydrotreated in terms of thermal stability. One of such poly-alpha-olefins may be singularly used or, alternatively, a mixture of two or more thereof may be used.

(5) Polyvinylether (PVE)

The polyvinylether usable as the base oil includes: polyvinylether obtained by polymerizing vinylether monomers (hereinafter referred to as polyvinylether I) and polyvinylether obtained by co-polymerizing vinylether monomers and hydrocarbon monomers having an olefin double-bond (hereinafter referred to as polyvinylether copolymer II).

Examples of the vinylether monomer usable as a material of the polyvinylether I are vinylmethylether, vinylethylether, vinyl-n-propylether and vinyl-isopropylether. These vinylether monomers can be prepared by a known method.

Examples of the vinylether monomer usable as a material of the polyvinylether copolymer II are the same as those of the vinylether monomer for the polyvinylether I, and one of the examples may be singularly used or, alternatively, two or more thereof may be used in combination. Examples of the hydrocarbon monomer having an olefin double-bond (i.e., the other material of the polyvinylether copolymer II) are ethylene, propylene, butenes, pentenes, hexenes, heptenes, octenes, diosobutylene, triisobutylene, styrene, alpha-methyl styrene and alkyl-substituted styrenes. In particular, polyethylvinylether, polyisobutylvinylether and a copolymer of polyethylvinylether and polyisobutylvinylether are preferable.

(6) Polyalkylene Glycol (PAG)

According to the exemplary embodiment, the polyalkylene glycol usable as the base oil is, for instance, a compound represented by the following formula (3).

$$R^9-[(OR^{10})_{m1}-OR^{11}]_{n1} \quad (3)$$

In the formula: $R^9$ represents a hydrogen atom, an alkyl group having 1 to 10 carbon atoms, an acyl group having 2 to 10 carbon atoms or an aliphatic hydrocarbon group having 2 to 6 bonds and having 1 to 10 carbon atoms; $R^{10}$ represents an alkylene group having 2 to 4 carbon atoms; $R^{11}$ represents a hydrogen atom, an alkyl group having 1 to 10 carbon atoms or an acyl group having 2 to 10 carbon atoms; n1 is an integer of 1 to 6; and m 1 is a number with an average of m 1×n1 being within a range from 6 to 80.

Such polyalkylene glycols are favorably, for instance, polyoxypropylene glycol dimethyl ether, polyoxypropylene glycol monomethyl ether, poly(oxyethylene)(oxypropylene) glycol dimethyl ether, poly(oxyethylene)(oxypropylene)glycol monomethyl ether, polyoxypropylene glycol monobutyl ether and polyoxypropylene glycol diacetate in terms of economic efficiency and effects.

(7) Polycarbonate (PC)

For the present composition, the polycarbonate compound usable as the base oil may be polycarbonate having two or more carbonate bonds in one molecule. Specifically, the polycarbonate compound may preferably be at least one selected from among (i) a compound represented by the following formula (4) and (ii) a compound represented by the following formula (5).

Formula 2

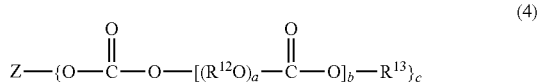
(4)

In the formula: Z represents a residue obtained by removing a hydroxyl group from a c-valent alcohol having 1 to 12 carbon atoms; $R^{12}$ represents a linear or branched alkylene group having 2 to 10 carbon atoms; $R^{13}$ represents a monovalent hydrocarbon group having 1 to 12 carbon atoms or a group having an ether bond represented by $R^{15}(O-R^{14})$ d-, in which $R^{15}$ represents a hydrogen atom or a monovalent hydrocarbon group having 1 to 12 carbon atoms, $R^{14}$ represents a linear or branched alkylene group having 2 to 10 carbon atoms, and d is an integer of 1 to 20; a is an integer of 1 of 30; b is an integer of 1 to 50; and c is an integer of 1 to 6.

Formula 3

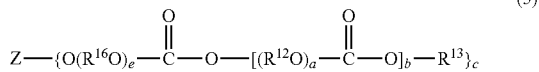
(5)

In the formula, $R^{16}$ represents a liner or branched alkylene group having 2 to 10 carbon atoms, e is an integer of 1 to 20, and Z, $R^{12}$, $R^{13}$, a, b and c are defined to be the same as above.

In the formulae (4) and (5), Z is a residue obtained by removing a hydroxyl group from any one of mono- to hexa-valent alcohols having 1 to 12 carbon atoms, and is particularly preferably a residue obtained by removing a hydroxyl group from a monovalent alcohol having 1 to 12 carbon atoms.

(8) Polyol Ester (POE)

For the present composition, the polyol ester compound usable as the base oil is preferably an ester of a diol or a polyol having approximately 3 to 20 hydroxyl groups and a fatty acid having approximately 1 to 24 carbon atoms. In terms of hydrolytic stability, a polyol is particularly preferable, an ester of neopentyl glycol, trimethylolethane, trimethylolpropane, trimethylolbutane or pentaerythritol is more preferable, and an ester of pentaerythritol is the most preferable due to its particularly excellent compatibility with the refrigerant and hydrolytic stability.

In terms of lubricity, the fatty acid preferably has 3 or more carbon atoms, more preferably has 4 or more carbon atoms, further more preferably 5 or more carbon atoms, and most preferably has 10 or more carbon atoms. Further, in terms of compatibility with the refrigerant, the fatty acid preferably has 18 or less carbon atoms, more preferably has 12 or less carbon atoms, and most preferably has 9 or less carbon atoms. The fatty acid may be a linear or branched. While being preferably linear in terms of lubricity, the fatty acid is preferably branched in terms of hydrolytic stability. The fatty acid may be saturated or unsaturated. In particular, pentaerythritol octanoic acid nonanoic acid ester is preferable.

(9) Ether Compound

For the present composition, for instance, an ether compound having a structure represented by the following formula (1) is preferable as the base oil.

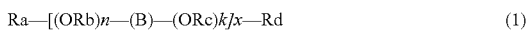
(1)

In the formula: Ra and Rd each represent a hydrogen atom, an alkyl group having 1 to 10 carbon atoms, an acyl group having 2 to 10 carbon atoms, or a hydrocarbon group having 2 to 6 bonds and having 1 to 10 carbon atoms; Rb and Re each represent an alkylene group having 2 to 4 carbon atoms; n and k each are an integer of 0 to 20; x is an integer of 1 to 6; and (B) represents a polymer portion having 3 or more monomer units represented by the following formula (2).

Formula 4

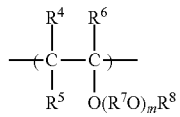
(2)

In the formula (2), $R^4$, $R^5$ and $R^6$ each represent a hydrogen atom or a hydrocarbon group having 1 to 8 carbon atoms and may be mutually the same or different. $R^7$ represents a divalent hydrocarbon group having 1 to 10 carbon atoms or a divalent ether-bonded oxygen-containing hydrocarbon group having 2 to 20 carbon atoms. $R^8$ represents a hydrogen atom or a hydrocarbon group having 1 to 20 carbon atoms. m is a number with an average of 0 to 10 and plural m are mutually the same or different in each unit. $R^4$ to $R^8$ are mutually the same or different in each unit. Plural $R^7O$ are mutually the same or different. m in the formula (2) is an integer of 1 or more when k and n in the formula (1) are both 0.

The above ether compound may be prepared by polymerizing vinyl ether monomers using one of alkylene glycol, polyalkylene glycol and a monoether of alkylene glycol or polyalkylene glycol as an initiator.

The ether compound preferably has a terminal structure as follows. Specifically, in terms of stability of synthesis reaction, the ether compound preferably has a structure of the formula (1), in which Ra is a hydrogen atom, n is 0, Rd (the other end) is hydrogen atom, and k is 0. In particular, a copolymer of polypropylene glycol and polyethylvinylether and a copolymer of polyethylene glycol and polyethylvinylether are preferable.

Regarding the above synthetic base oils (compounds), the molecular weight is preferably in a range from 150 to 5,000 and more preferably in a range from 300 to 3000 in terms of suppression of evaporation, flash point, properties required of a refrigerant oil, and the like. The viscosity index is preferably 60 or more.

According to the exemplary embodiment, one of the above base oils (mineral oils and synthetic base oils) may be singularly used or a mixture thereof may be used. In either case, a preferable kinematic viscosity at 100 degrees C. is in a range from 1 mm²/s to 50 mm²/s, more preferably in a range from 3 mm²/s to 50 mm²/s, further more preferably in a range from 5 mm²/s to 30 mm²/s, and particularly preferably in a range from 5 mm²/s to 20 mm²/s.

The viscosity index of the base oil of the present composition is preferably 60 or more, more preferably 80 or more, and further more preferably 100 or more.

In the present composition, a hydrocarbon compound having a biphenyl structure or a stilbene structure is blended as the additive in the base oil. The additive is hereinafter also referred to as the present additive.

The present additive functions as a leakage detector to detect the leakage of the refrigerant and the present composition from a refrigerating machine (refrigerating system). Specifically, a hydrocarbon compound having a conjugated system such as a biphenyl structure and a stilbene structure emits fluorescent light in response to ultraviolet ray applied thereto, so that a leakage spot can be easily found. Further, a system including a lubricating oil composition provided by blending the present additive and a refrigerant is thermally and chemically stable.

Examples of the hydrocarbon compound having a biphenyl structure are compounds having skeleton structures represented by the following formulae (6) to (8). The benzene rings are not subject to particular limitations in terms of number and bonding position. Further, each benzene ring may be bonded with one or plural hydrocarbon groups (e.g., alkyl group) at any bonding position.

Formula 5

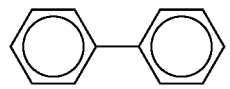

(6)

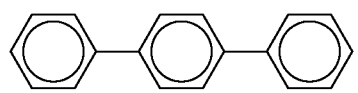

(7)

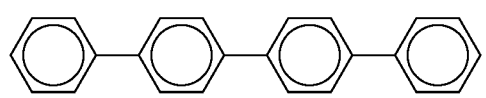

(8)

Examples of the hydrocarbon compound having a stilbene structure are compounds having skeleton structures represented by the following formulae (9) and (10). The stilbene structure may be a cis structure or a trans structure. The benzene rings are not subject to particular limitations in terms of number and bonding position. Further, each benzene ring may be bonded with one or plural hydrocarbon groups (e.g., alkyl group) at any bonding position.

Formula 6

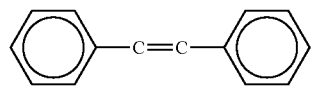

(9)

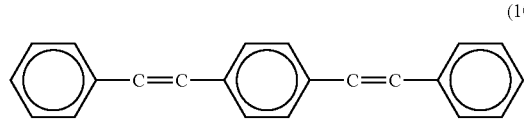

(10)

Preferable examples of the hydrocarbon compound are p-bis(o-methylstyryl)benzene, 2,5,2'''',5''''-tetramethyl-p-quarterphenyl and 2'',3,3',3'''-tetramethyl-1,1':4',1'':4'',1'''-quaterbenzene. Among the above, p-bis(o-methylstyryeben-zene is particularly preferable.

The blending amount (added amount) of the hydrocarbon compound relative to the lubricating oil composition is preferably in a range from 0.001 mass % to 10 mass %, more preferably in a range from 0.001 mass % to 1 mass %, further more preferably in a range from 0.001 mass % to 0.5 mass %, and the most preferably in a range from 0.001 mass % to 0.1 mass %. When the blending amount falls below the above lower limit, a leakage spot is unlikely to be found due to a small amount of fluorescent light emitted in response to the leakage of the present composition from a refrigerating machine. On the other hand, when the hydrocarbon compound is blended in an amount more than the above upper limit, the performance of the hydrocarbon compound as a leakage detector cannot be especially improved while the stability of the present composition may be impaired.

The refrigerant usable with the present composition may be a saturated hydrofluorocarbon compound (saturated HFC), carbon dioxide ($CO_2$), hydrocarbon (HC) having 5 or less carbon atoms, ammonia or the like. Considering a low global warming potential, the refrigerant preferably contains at least one fluorine-containing organic compound selected from among compounds represented by the following molecular formula (A) or a combination of the fluorine-containing organic compound and a saturated hydrofluorocarbon compound.

$$C_pO_qF_rR_s \qquad (A)$$

In the formula: R represents Cl, Br, I or hydrogen; p is an integer of 1 to 6; q is an integer of 0 to 2; r is an integer of 1 to 14; and s is an integer of 0 to 13. When q is 0, p is an integer of 2 to 6 and one or more unsaturated carbon-carbon bonds are contained in a molecule.

The saturated hydrofluorocarbon compound (saturated HFC) may be singularly used as a refrigerant or may be mixed with at least one fluorine-containing organic compound selected from among compounds represented by the formula (A) as needed to be used as a refrigerant.

The saturated HFC is preferably an alkane fluoride having 1 to 4 carbon atoms. In particular, methane or ethane fluorides having 1 or 2 carbon atoms such as trifluoromethane, difluoromethane, 1,1-difluoroethane, 1,1,1-trifluoroethane, 1,1,2-trifluoroethane, 1,1,1,2-tetrafluoroethane, 1,1,2,2-tetrafluoroethane and 1,1,1,2,2-pentafluoropropane are favorable.

When the saturated HFC is mixed with the refrigerant compound of (A) in use, the blending amount of the compound is preferably 30 mass % or less of the total amount of the refrigerant, more preferably 20 mass % or less and further more preferably 10 mass % or less.

Next, the refrigerant represented by the molecular formula (A) will be described in detail.

The molecular formula (A), which shows the types and numbers of elements in the molecule, represents a fluorine-containing organic compound in which the number p of carbon atoms C is 1 to 6. Any fluorine-containing organic compound having 1 to 6 carbon atoms possesses physical and chemical properties such as a boiling point, a freezing point and an evaporative latent heat required of a refrigerant.

In the molecular formula (A), the bonding configurations of p carbon atoms represented by $C_p$ include carbon-carbon single bond, unsaturated bond such as carbon-carbon double bond and carbon-oxygen double bond. Unsaturated carbon-carbon bond is preferably carbon-carbon double bond in terms of stability. While the number of unsaturated carbon-carbon bond is 1 or more, the number is preferably 1.

In the molecular formula (A), the bonding configurations of q oxygen atoms represented by $O_q$ are preferably oxygen derived from an ether group, a hydroxyl group or a carbonyl group. The number q of oxygen atoms may be 2, which is also true of when two ether groups, hydroxyl groups or the like are contained. On the other hand, when q is 0 (i.e., no oxygen atom is contained in the molecule), p is in a range from 2 to 6 and one or more unsaturated bonds such as carbon-carbon double bond are contained in the molecule. In other words, at least one of the bonding configurations of p carbon atoms represented by $C_p$ is required to be unsaturated carbon-carbon bond.

In the molecular formula (A), R represents Cl, Br, I or hydrogen. R may be any one of Cl, Br, I and hydrogen but is preferably hydrogen, which is less likely to lead to ozone depletion.

As described above, preferable examples of the fluorine-containing organic compound represented by the molecular formula (A) are an unsaturated hydrofluorocarbon compound, a fluoroether compound, a fluoroalcohol compound and a fluoroketone compound.

The unsaturated hydrofluorocarbon compound in the above-listed compounds will be described below in detail.

According to the exemplary embodiment, an example of the unsaturated hydrofluorocarbon compound usable as a refrigerant for a refrigerating machine is an unsaturated hydrofluorocarbon compound represented by the molecular formula (A), in which R is hydrogen, p is an integer of 2 to 6, q is 0, r is an integer of 1 to 12, and s is an integer of 0 to 11.

Preferable examples of the unsaturated hydrofluorocarbon compound are a fluoride of a linear or branched chained olefin having 2 to 6 carbon atoms and a fluoride of a cyclic olefin having 4 to 6 carbon atoms.

Specific examples of the unsaturated hydrofluorocarbon compound are ethylene substituted with 1 to 3 fluorine atoms, propene substituted with 1 to 5 fluorine atoms, butenes substituted with 1 to 7 fluorine atoms, pentenes substituted with 1 to 9 fluorine atoms, hexenes substituted with 1 to 11 fluorine atoms, cyclobutene substituted with 1 to 5 fluorine atoms, cyclopentene substituted with 1 to 7 fluorine atoms, and cyclohexene substituted with 1 to 9 fluorine atoms.

Among the above unsaturated hydrofluorocarbon compounds, an unsaturated hydrofluorocarbon compound having 2 or 3 carbon atoms is preferable and, in particular, a propene fluoride is more preferable. Specifically, among compounds represented by the molecular formula (A), a compound represented by $C_3HF_3$, $C_3H_2F_4$ or $C_3H_3F_3$ is preferable due to a low global warming potential. Examples of the propene fluoride are a variety of isomers of pentafluoropropene, 3,3,3-trifluoropropene, 1,3,3,3-tetrafluoropropene and 2,3,3,3-tetrafluoropropene, among which 1,3,3,3-tetrafluoropropene (HFO1234ze) and 2,3,3,3-tetrafluoropropene (HFO1234yf) are particularly preferable due to a low global warming potential.

A combination of a saturated hydrofluorocarbon refrigerant having 1 or 2 carbon atoms and an unsaturated hydrofluorocarbon refrigerant having 3 carbon atoms is also favorably usable. Examples of such a combination are a combination of HFO1234yf (mentioned above) and $CH_2F_2$ (HFC32), a combination of HFO1234ze and HFC32, a combination of HFO1234yf and $CHF_2CH_3$ (HFC152a), and a combination of HFO1234ze and HFC152a.

The present composition may further contain at least one additive selected from among an extreme pressure agent, an oiliness agent, an antioxidant, an acid scavenger, a metal deactivator and an antifoaming agent as long as an object of the invention is achieved.

Examples of the extreme pressure agent are: phosphorus extreme pressure agents such as phosphate, acid phosphate, phosphite, acid phosphite and amine salts thereof; metal carboxylate; and sulfur extreme pressure agents such as sulfurized fat and oil, sulfurized fatty acid, ester sulfide, olefin sulfide, dihydrocarbyl polysulfide, thiocarbamates, thioterpenes and dialkyl thiodipropionates.

The blending amount of the extreme pressure agent is preferably in a range from 0.001 mass % to 10 mass % of the total amount of the composition in terms of lubricity and stability.

Examples of the oiliness agent are: aliphatic saturated or unsatulated monocarboxylic acids such as stearic acid and oleic acid; polymerized fatty acids such as dimer acid and hydrogenated dimer acid; hydroxyl fatty acid such as ricinoleic acid and 12-hydroxystearic acid; aliphatic saturated or unsaturated monoalcohols such as lauryl alcohol and oleyl alcohol; aliphatic saturated or unsaturated monoamines such as stearylamine and oleylamine; aliphatic saturated or unsaturated monocarboxylic acid amides such as lauric acid amide and oleic acid amide; and partial esters of polyhydric alcohols such as glycerin and sorbitol and aliphatic saturated or unsaturated monocarboxylic acids.

The blending amount of the oiliness agent is preferably in a range from 0.01 mass % to 10 mass % of the total amount of the composition.

Preferable examples of the antioxidant are phenol antioxidants such as 2,6-di-tert-butyl-4-methylphenol, 2,6-di-tert-butyl-4-ethylphenol and 2,2'-methylenebis(4-methyl-6-tert-butylphenol) and amine antioxidants such as phenyl-alpha-naphthylamine and N,N'-diphenyl-p-phenylenediamine. The blending amount of the antioxidant is preferably in a range from 0.01 mass % to 5 mass % of the total amount of the composition in terms of effects, economic efficiency and the like.

Examples of the acid scavenger are phenyl glycidyl ether, alkyl glycidyl ether, alkylene glycol glycidyl ether (e.g., polypropylene glycol diglycidyl ether), phenyl glycidyl ester, alkyl glycidyl ester, cyclohexene oxide, alpha-olefin oxide, epoxy compounds such as epoxidized soybean oil. Among the above, phenyl glycidyl ether, alkyl glycidyl ether, alkylene glycol glycidyl ether, cyclohexene oxide and alpha-olefin oxide are preferable in terms of compatibility.

The blending amount of the acid scavenger is preferably in a range from 0.005 mass % to 5 mass % of the total amount of the composition in terms of effects and suppression of generation of sludge.

According to the exemplary embodiment, the stability of the present composition can be improved by blending the acid scavenger. Further, when the above extreme pressure agent and antioxidant are additionally used, the stability of the composition can be further improved.

An example of the metal deactivator is N—[N',N'-dialkyl (an alkyl group having 3 to 12 carbon atoms) aminomethyl] tolutriazole. Examples of the antifoaming agent are silicone oil and fluorinated silicone oil.

The kinematic viscosity at 40 degrees C. of the present composition is preferably in a range from 1 $mm^2/s$ to 400 $mm^2/s$, more preferably in a range from 3 $mm^2/s$ to 300 $mm^2/s$, and further more preferably in a range from 5 $mm^2/s$ to 200 $mm^2/s$.

When a refrigerating machine uses the present composition, the above-listed refrigerants and the present composition are used preferably in a mass ratio of 99/1 to 10/90 (refrigerant/the present composition) and more preferably in a mass ratio of 95/5 to 30/70. When the amount of the refrigerant falls below the above range, the refrigerating performance is unfavorably lowered. When the amount of the refrigerant exceeds the above range, the lubricity is unfavorably lowered.

Examples of a refrigerating machine (refrigerating system) in which the present composition is favorably usable are a compressor, a condenser, an expansion mechanism (e.g., capillary tube and expansion valve), a refrigerating system necessarily provided with an evaporator, a refrigerating system provided with an ejector cycle, and a refrigerating system provided with a dryer (desiccant: natural/synthetic zeolite). The compressor may be open, semi-hermetic or hermetically sealed and a motor of the hermetically sealed compressor may be an AC motor or a DC motor. A compression method may be rotary compression, scroll compression, swing compression or piston compression. The compressor may be a small-sized compressor (approximately 0.2 kW) or a large-sized compressor (approximately 30 kW).

The amount of water contained in such a refrigerating system is preferably 500 mass ppm or less and more preferably 300 mass ppm or less. The partial pressure of residual air is preferably 13 kPa or less, more preferably 10 kPa or less, and further more preferably 5 kPa or less.

Since the base oil of the present composition is blended with an additive in a form of a hydrocarbon compound having a biphenyl structure or a stilbene structure, the thermal stability and chemical stability of the lubricating oil composition are not impaired. Therefore, when the present lubricating oil composition for refrigerating machines is used in, for instance, an automobile air-conditioner, an electric automobile air-conditioner, a gas heat pump, other air-conditioning equipment, a refrigerating machine, a vending machine, a showcase, a water-heating system and a refrigerating machine with a refrigerating/heating system, it is possible to detect the leakage of a refrigerant with a long-term stability. When an unsaturated chlorofluorocarbon refrigerant with a low stability is used in the above-listed equipment, the present composition is significantly advantageous.

EXAMPLE(S)

Next, the exemplary embodiment of the invention will be described in further detail with reference to Examples, which are by no means intended to limit the scope of the invention.

Examples 1 to 10 and Comparatives 1 to 5

Lubricating oil compositions were prepared according to formulations as shown in Tables 1 and 2 and the thermal/chemical stability of each composition was evaluated by the following thermal-stability test.

Thermal-Stability Test

An autoclave (an inner value: 200 mL) filled with the composition/refrigerant (ratio: 30 g/30 g, water content in the composition: 500 mass ppm) and a metal catalyst made of iron, copper and aluminum was closed (air: 25 mL) and left under the conditions of a temperature of 175 degrees C. for 168 hours. An acid value was then measured. Incidentally, the acid value was measured by an electrical potential technique in accordance with "Determination of Lubricant Neutralization Number" defined by JIS K2501.

HFO1234yf (2,3,3,3-tetrafluoropropene) was used as the refrigerant.

TABLE 1

|  |  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Formulation (mass %) | Base Oil | PAG | 94.2 | 93.8 | 94.2 | 94.2 | — | — | — | — | — | — |
|  |  | PVE | — | — | — | — | 94.2 | 93.8 | — | — | — | — |
|  |  | ECP | — | — | — | — | — | — | 94.2 | 93.8 | — | — |
|  |  | POE | — | — | — | — | — | — | — | — | 94.2 | 93.8 |
|  | Leakage Detector 1 |  | 0.1 | 0.5 | — | — | 0.1 | 0.5 | 0.1 | 0.5 | 0.1 | 0.5 |
|  | Leakage Detector 2 |  | — | — | 0.1 | — | — | — | — | — | — | — |
|  | Leakage Detector 3 |  | — | — | — | 0.1 | — | — | — | — | — | — |
|  | Other Additives |  | 5.7 | 5.7 | 5.7 | 5.7 | 5.7 | 5.7 | 5.7 | 5.7 | 5.7 | 5.7 |
|  | (Total) |  | 100.0 | 100.0 | 100.0 | 100.0 | 100.0 | 100.0 | 100.0 | 100.0 | 100.0 | 100.0 |
| Thermal-stability Test | Acid Value (mgKOH/g) |  | 0.04 | 0.06 | 0.08 | 0.07 | 0.05 | 0.09 | 0.07 | 0.10 | 0.08 | 0.12 |

TABLE 2

|  |  |  | Comp. 1 | Comp. 2 | Comp. 3 | Comp. 4 | Comp. 5 |
|---|---|---|---|---|---|---|---|
| Formulation (mass %) | Base Oil | PAG | 94.2 | 93.8 | — | — | — |
|  |  | PVE | — | — | 94.2 | — | — |
|  |  | ECP | — | — | — | 94.2 | — |
|  |  | POE | — | — | — | — | 94.2 |
|  | Leakage Detector 4 |  | 0.1 | 0.5 | 0.1 | 0.1 | 0.1 |
|  | Other Additives |  | 5.7 | 5.7 | 5.7 | 5.7 | 5.7 |
|  | (Total) |  | 100.0 | 100.0 | 100.0 | 100.0 | 100.0 |
| Thermal-stability Test | Acid Value (mgKOH/g) |  | 0.31 | 0.65 | 0.39 | 0.36 | 0.37 |

The following base oils were used.
PAG: polyoxypropylene glycol dimethyl ether, kinematic viscosity at 100 degrees C.: 9.25 mm$^2$/s
PVE: polyvinyl ether, kinematic viscosity at 100 degrees C.: 15.97 mm$^2$/s
ECP: polyvinylether-polyalkyleneglycol copolymer (mole ratio: 1:1), kinematic viscosity at 100 degrees C.: 9.56 mm$^2$/s
POE: polyol ester, kinematic viscosity at 100 degrees C.: 68.5 mm$^2$/s The leakage detectors shown in Tables are as follows.
Leakage detector 1: p-bis(o-methylstylyl)benzene
Leakage detector 2: 2,5,2''',5'''-tetramethyl-p-quarterphenyl
Leakage detector 3: 2'',3,3',3'''-tetramethyl-1,1':4',1'':4'',1'''-quaterbenzene Leakage detector 4: 2-(4-tert-butylphenyl)-5-(4-biphenylyl)-1,3,4-oxadiazole Incidentally, other additives shown in Tables include antioxidant, acid scavenger, oxygen scavenger and extreme pressure agent.

Evaluation Results

The results in Table 1 show that any of Examples 1 to 10, each typifying a system in which a lubricating oil composition blended with an additive in a form of a hydrocarbon compound having a biphenyl structure or a stilbene structure is mixed with a refrigerant, did not experience an substantial increase in acid value, and thus the thermal/chemical stability thereof proves to be high.

On the other hands, the results in Table 2 show that Comparatives 1 to 5, in which additives structurally different from the additives used in Examples were blended, each experienced an increase in acid value, and thus the thermal/chemical stability thereof proves to be insufficient.

It is understood from the above results that even when the present lubricating oil composition for refrigerating machines blended with the predetermined additive is used in a refrigerating machine using a structurally unstable refrigerant, the leakage of the refrigerant can be detected with a long-lasting stability.

The invention claimed is:

1. A refrigerant composition comprising:
   a lubricating oil composition, comprising:
      a base oil; and
      an additive comprising a hydrocarbon compound; and
   a refrigerant consisting of an unsaturated hydrofuorocarbon compound,
   wherein:
   the hydrocarbon compound has a skeleton of formula (6), (7), (8), (9), or (10)

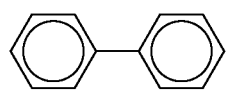
(6)

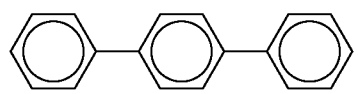
(7)

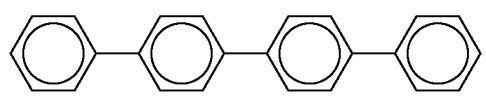
(8)

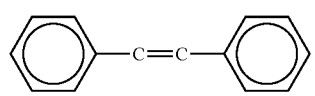
(9)

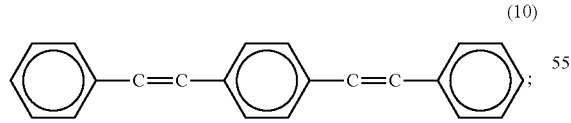
(10)

the additive is present in an amount of 0.001 mass % to 10 mass % based on a total mass of the lubricating oil composition; and
the base oil consists of at least one compound selected from the group consisting of a polyvinylether, a polyalkylene glycol, a polyol ester, and an ether compound of formula (1):

Ra—[(ORb)$_n$—(B)—(ORc)$_k$]$_x$—Rd     (1)

where:
  each of Ra and Rd is independently a hydrogen atom, an alkyl group having 1 to 10 carbon atoms, an acyl group having 2 to 10 carbon atoms, or a hydrocarbon group having 2 to 6 bonds and having 1 to 10 carbon atoms;
  each of Rb and Rc is independently an alkylene group having 2 to 4 carbon atoms;
  each of n and k is independently an integer of 0 to 20;
  x is an integer of 1 to 6; and
  (B) is a polymer portion having 3 or more monomer units represented by formula (2):

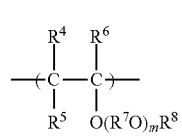
(2)

where:
  each of $R^4$, $R^5$, and $R^6$ is independently a hydrogen atom or a hydrocarbon group having 1 to 8 carbon atoms;
  each $R^7$ is independently a divalent hydrocarbon group having 1 to 10 carbon atoms or a divalent ether-bonded oxygen-containing hydrocarbon group having 2 to 20 carbon atoms;
  $R^8$ is a hydrogen atom or a hydrocarbon group having 1 to 20 carbon atoms;
  each m is independently an integer such that an average value of m among monomer units is 0 to 10;
  $R^4$ to $R^8$ may be the same or different among monomer units; and
  $R^7O$ may he the same or different among monomer units; and
  m in the formula (2) is an integer of 1 or more when k and n in the formula (1) are both 0.

2. A refrigerating machine, comprising the refrigerant composition according to claim 1.

3. The refrigerating machine according to claim 2, wherein the refrigerant is an unsaturated HFC having 3 carbon atoms and having a carbon-carbon double bond.

4. The refrigerant composition according to claim 1, wherein the base oil has a kinematic viscosity at 100 degrees C. of 1 to 50 mm²/s.

5. The refrigerant composition according to claim 1, comprising at least one additional additive selected from the group consisting of an extreme pressure agent, an oiliness agent, an antioxidant, an acid scavenger, a metal deactivator, and an antifoaming agent.

6. Refrigerating equipment comprising the refrigerant composition according to claim 1, wherein:
   the refrigerating equipment is selected from the group consisting of an open-type automobile air-conditioner, an electric automobile air-conditioner, a gas heat pump, air-conditioning equipment, a refrigerating machine, a vending machine, a showcase, a water-heating system, and a refrigerating/heating system.

7. The refrigerant composition according to claim 1, wherein the hydrocarbon compound emits fluorescent light when ultraviolet radiation is applied thereto.

8. The refrigerant composition according to claim 1, wherein the hydrocarbon compound has a cis stilbene structure.

9. The refrigerant composition according to claim 1, wherein the hydrocarbon compound has a trans stilbene structure.

10. The refrigerant composition according to claim 1, wherein the hydrocarbon compound is selected from the group consisting of p-bis(o-methylstyryl)benzene, 2,5,2''',5'''-tetramethyl-p-quarterphenyl, and 2'',3,3',3'''-tetramethyl-1,1':4',1'':4'',1'''-quaterbenzene.

11. The refrigerant composition according to claim 1, wherein the hydrocarbon compound is p-bis(o-methylstyryl)benzene.

12. The refrigerant composition according to claim 1, wherein the additive is present in an amount of 0.001 mass % to 1 mass % based on the total mass of the lubricating oil composition.

13. The refrigerant composition according to claim 1, wherein the additive is present in an amount of 0.001 mass % to 0.5 mass % based on the total mass of the lubricating oil composition.

14. The refrigerant composition according to claim 1, wherein the additive is present in an amount of 0.001 mass % to 0.1 mass % based on the total mass of the lubricating oil composition.

15. A refrigerant composition, comprising:
a lubricating oil composition, comprising:
a base oil; and
an additive comprising a hydrocarbon compound; and
a refrigerant consisting of an unsaturated hydrauorocarbon compound,
wherein:
the hydrocarbon compound has a skeleton of formula (9) or (10)

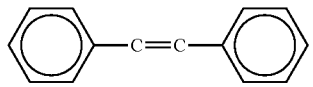
(9)

(10)

the additive is present in an amount of 0.001 mass % to 10 mass % based on a total mass of the lubricating oil composition; and
the base oil comprises at least one compound selected from the group consisting of a polyvinylether, a polyalkylene glycol, a polyol ester, and an ether compound of formula (1):

Ra—[(ORb)$_n$—(B)—(ORc)$_k$]$_x$—Rd (1)

where:
each of Ra and Rd is independently a hydrogen atom, an alkyl group having 1 to 10 carbon atoms, an acyl group having 2 to 10 carbon atoms, or a hydrocarbon group having 2 to 6 bonds and having 1 to 10 carbon atoms;
each of Rb and Rc is independently an alkylene group having 2 to 4 carbon atoms;
each of n and k is independently an integer of 0 to 20;
x is an integer of 1 to 6; and
(B) is a polymer portion having 3 or more monomer units represented by formula (2):

(2)

where:
each of $R^4$, $R^5$, and $R^6$ is independently a hydrogen atom or a hydrocarbon group having 1 to 8 carbon atoms;
each $R^7$ is independently a divalent hydrocarbon group having 1 to 10 carbon atoms or a divalent ether-bonded oxygen-containing hydrocarbon group having 2 to 20 carbon atoms;
$R^8$ is a hydrogen atom or a hydrocarbon group having 1 to 20 carbon atoms;
each m is independently an integer such that an average value of m among monomer units is 0 to 10;
$R^4$ to $R^8$ may be the same or different among monomer units; and
$R^7O$ may be the same or different among monomer units; and
m in the formula (2) is integer of 1 or more when k and n in the formula (1) are both 0.

16. A refrigerant composition, comprising:
a lubricating oil composition, comprising:
a polyalkylene glycol base oil; and
p-bis(o-methylstylyl)benzene; and
HFO1234yf,
wherein the p-bis(o-methylstyly)benzene is present in an amount of 0.001 mass % to 1 mass % based on a total mass of the lubricating oil composition.

17. The refrigerant composition according to claim 1, wherein the polyalkylene glycol base oil comprises at least one of polyoxyethylene glycol dimethyl ether and polyoxypropylenc glycol monomethylether.

* * * * *